United States Patent
Kim et al.

(10) Patent No.: US 10,903,768 B2
(45) Date of Patent: Jan. 26, 2021

(54) METHOD OF CORRECTING A SIGNAL DELAY OF A HALL SENSOR FOR AN AIR COMPRESSOR MOTOR

(71) Applicants: HYUNDAI MOTOR COMPANY, Seoul (KR); KIA MOTORS CORPORATION, Seoul (KR)

(72) Inventors: Sung-Do Kim, Seoul (KR); Min-Su Kang, Paju-si (KR); Chang-Seok You, Hwaseong-si (KR); Dong-Hun Lee, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/593,394

(22) Filed: Oct. 4, 2019

(65) Prior Publication Data
US 2020/0220487 A1    Jul. 9, 2020

(30) Foreign Application Priority Data
Jan. 3, 2019    (KR) .................. 10-2019-0000641

(51) Int. Cl.
*H02P 21/05*    (2006.01)
*F04D 27/00*    (2006.01)

(52) U.S. Cl.
CPC ............ *H02P 21/05* (2013.01); *F04D 27/001* (2013.01); *H02P 2207/055* (2013.01)

(58) Field of Classification Search
CPC .............................. H02P 21/05; F04D 27/001
USPC ........................................................ 318/560
See application file for complete search history.

(56) References Cited

U.S. PATENT DOCUMENTS

| | | | | |
|---|---|---|---|---|
| 4,028,008 A * | 6/1977 | Shelton | ...................... | F03G 6/00 417/52 |
| 6,020,700 A * | 2/2000 | Tien | .......................... | H02P 6/14 318/400.26 |
| 6,268,074 B1 * | 7/2001 | Siepierski | .......... | H01M 8/04119 429/416 |
| 8,748,048 B2 * | 6/2014 | Sugawara | ......... | H01M 8/04126 429/414 |
| 9,328,949 B2 * | 5/2016 | Blaiklock | ........... | F04D 27/0207 |

(Continued)

FOREIGN PATENT DOCUMENTS

KR    101655537 B1    9/2016

*Primary Examiner* — Bentsu Ro
(74) *Attorney, Agent, or Firm* — Lempia Summerfield Katz LLC

(57) ABSTRACT

A method of correcting a signal delay of a Hall sensor for an air compressor motor when the air compressor motor rotates at a high speed includes: a first step of calculating an offset angle θ from a voltage equation, to which a q-axis voltage and a d-axis voltage are applied, by performing zero current control when an inertia braking section occurs during an operation of the motor; a second step of calculating a reference offset angle $θ_{offset}$ of the Hall sensor and a delay time t by using an angular velocity ω at any two points in the inertia braking section by using the equation for calculating the offset angle θ; and a third step of calculating a corrected q-axis voltage and a corrected d-axis voltage through the zero current control corrected and comparing the corrected q-axis voltage and the corrected d-axis voltage with a reference error.

4 Claims, 1 Drawing Sheet

(56) References Cited

U.S. PATENT DOCUMENTS 10,103,394 B2 * 10/2018 Matsubara ........ H01M 8/04179
2003/0062205 A1 * 4/2003 Konrad ................ F04B 35/002
　　　　　　　　　　　　　　　　　　　180/65.245

* cited by examiner

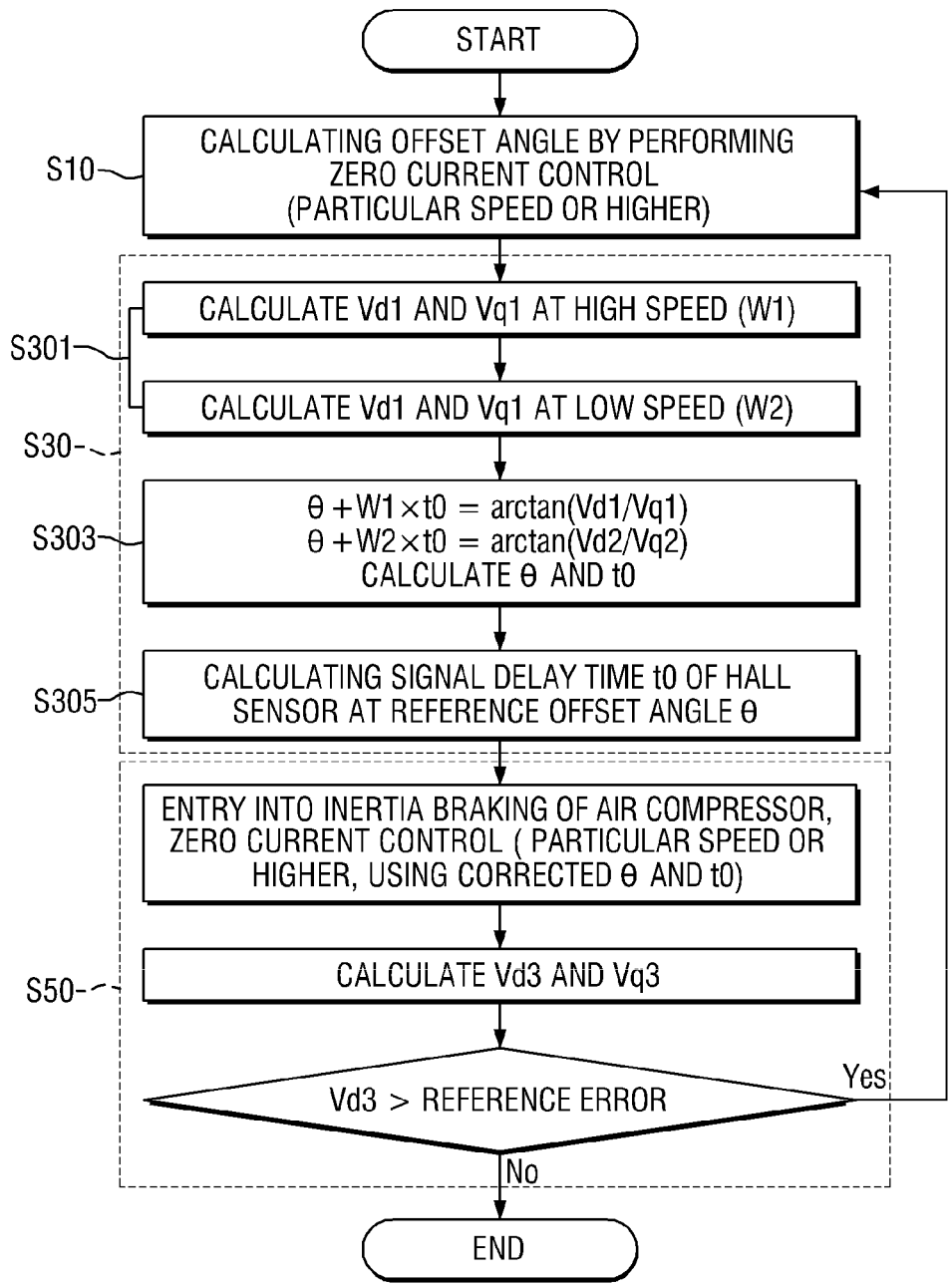

METHOD OF CORRECTING A SIGNAL DELAY OF A HALL SENSOR FOR AN AIR COMPRESSOR MOTOR

CROSS-REFERENCE TO RELATED APPLICATIONS

This application claims priority under 35 U.S.C. § 119 to Korean Patent Application No. 10-2019-0000641, filed on Jan. 3, 2019, in the Korean Intellectual Property Office, the disclosure of which is incorporated herein by reference in its entirety.

BACKGROUND

1. Field of the Disclosure

The present disclosure relates to a method of correcting a signal delay of a Hall sensor for an air compressor Motor. Particularly, the disclosure relates to a method of correcting a signal delay of a Hall sensor for an air compressor motor which improves speed control stability when the air compressor motor rotates at a high speed.

2. Description of the Related Art

Considering costs and packages regarding an air compressor for a vehicle, operation control at a high speed of 100,000 rpm or more needs to be implemented by using a low-priced Hall sensor instead of using a resolver to control the drive motor. In order to achieve high efficiency directly associated with fuel economy, the aforementioned function is implemented by three-phase pulse width modulation (PWM) vector control, which is not currently used for a motor mounted with a Hall sensor in related industries. A motor speed error at a high speed is greatly reduced by precisely calculating the Hall sensor speed by utilizing a microcomputer. Therefore, the influence of various factors are increased in proportion to a speed of the motor. Such factors may include hardware (H/W) manufacturing deviations such as Hall sensor mounting position offset deviations, time delay elements caused by filter components of a Hall sensor output and sensing circuit, errors of a passive element of a printed circuit board (PCB), and time delay elements caused by software (SW) filtering, which affect the measurement of Hall sensor positions in the related art. As a result, the effect of the influence of these factors is very high when the present technology is applied to fuel cell Proto bus power control unit (BPCU) SW.

In this regard, Korean Patent Application Laid-Open Application No. 10-2016-0036210 (the 10-2016-0036210 Korean Application) in the related art (Method of Detecting Position of Motor and Calculating Speed of Motor by Using Hall Sensor) relates to a method of detecting a position of a motor and calculating a speed of the motor by using a Hall sensor. More particularly, the 10-2016-0036210 Korean Application relates to a method of detecting a position of a motor and calculating a speed of the motor by using a Hall sensor which may improve precision when calculating, by using the Hall sensor, the speed and the rotor position of the motor that rotates at a high speed.

However, because signal delay elements of the Hall sensor of the motor are managed as design parameters, there is a risk that position errors may occur when the motor operates at a high speed due to manufacturing deviations occurring during mass production. Because the signal delay elements of the Hall sensor of the motor are caused by the Hall sensor measurement circuit of the motor, there is a problem when tolerances such as passive errors and filter component errors on the PCB need to be managed.

SUMMARY OF THE DISCLOSURE

The present disclosure has been made in an effort to provide a method of compensating for a measurement delay element with respect to an output of a Hall sensor signal which affects speed precision during high-speed operation control of a surface mounted permanent magnetic synchronous motor (SMPMSM) having a high rotational speed by using a Hall sensor as a position sensor.

An embodiment of the present disclosure provides a method of correcting a signal delay of a Hall sensor for an air compressor motor which controls a speed error of torque oscillation when the air compressor motor for a fuel cell vehicle rotates at a high speed. The method includes a first step of calculating an offset angle θ from a voltage equation, to which a q-axis voltage and a d-axis voltage are applied, by performing zero current control when an inertia braking section occurs during an operation of the motor. The method further includes a second step of calculating a reference offset angle $\theta_{offset}$ of the Hall sensor and a delay time t by using an angular velocity ω at any two points in the inertia braking section by using the equation for calculating the offset angle θ. The method also includes a third step of calculating a corrected q-axis voltage and a corrected d-axis voltage through the zero current control corrected by the reference offset angle $\theta_{offset}$ and the delay time t and comparing the corrected q-axis voltage and the corrected d-axis voltage with a reference error. When the corrected q-axis voltage and the corrected d-axis voltage exceed a range of the reference error, the first to third steps are repeated to correct the signal delay of the Hall sensor.

The first step may calculate the offset angle θ by using $$\theta = \tan^{-1}\frac{V_d}{V_q}$$

($V_d$: d-axis voltage, $V_q$: q-axis voltage).

In the first step, the q-axis voltage may be a back electromotive voltage when the zero current control is performed. A value of 0 may be applied to the d-axis voltage when there is neither an offset angle nor a delay time.

The second step may calculate the reference offset angle $\theta_{offset}$ and the delay time t by applying an equation $\theta=\theta_{offset}+\omega_0 t_0$ ($\omega_0$: angular velocity (rad/s), $t_0$: delay time of Hall sensor) and inputting any angular velocities $\omega_1$ and $\omega_2$ and $\theta_1$ and $\theta_2$ in the inertia braking section.

According to the present disclosure having the aforementioned configuration, there is an advantage since the stability of current control and the stability of speed control of the motor are improved by reducing motor torque oscillation when the air compressor motor rotates at a high speed.

According to the present disclosure, a motor position error, which is caused by a signal measurement delay of the Hall sensor when controlling a current of the air compressor motor, is minimized. As a result, there is an advantage since an unnecessary d-axis current is reduced and the current consumption of the air compressor is reduced, which contributes to the improvement of vehicle fuel economy.

According to the present disclosure, there is another advantage since productivity and quality are improved by virtue of the effect of reducing manufacturing deviations of factors that affect the positions of the Hall sensor for an air compressor motor and the signal delay of the Hall sensor circuit.

BRIEF DESCRIPTION OF THE DRAWINGS

FIG. 1 is a flowchart illustrating a method of correcting a signal delay of a Hall sensor for an air compressor motor according to an embodiment of the present disclosure.

DETAILED DESCRIPTION OF THE EMBODIMENTS

Hereinafter, the present disclosure is described in detail with reference to the accompanying drawings. However, the present disclosure is not restricted or limited by the embodiments.

Like reference numerals indicated in the respective drawings refer to members which perform substantially the same functions. An object and an effect of the present disclosure may be naturally understood or may become clearer from the following description. The object and the effect of the present disclosure are not restricted only by the following description. In addition, in the description of the present disclosure, the specific descriptions of publicly known technologies related with the present disclosure are omitted when it is determined that the specific descriptions may unnecessarily obscure the subject matter of the present disclosure.

FIG. 1 is a flowchart illustrating a method of correcting a signal delay of a Hall sensor for an air compressor motor according to an embodiment of the present disclosure.

Referring to FIG. 1, the method of correcting a signal delay of a Hall sensor for an air compressor motor may include first to third steps S10, S30 and S50.

The method corrects a signal delay of a Hall sensor for an air compressor motor which controls a speed error of torque oscillation when the air compressor motor for a fuel cell vehicle rotates at a high speed. The first step S10 calculates an offset angle θ from a voltage equation, to which a q-axis voltage and a d-axis voltage are applied, by performing zero current control when an inertia braking section occurs during an operation of the motor.

In the first to third steps S10, S30 and S50, the amount that $V_d$ deviates from 0 in the zero current control during inertia braking needs to be calculated in order to accurately and quickly compensate for a measurement delay element of a Hall sensor signal during compensation control. In this case, it is possible to mathematize a phenomenon in which an offset recognized by a controller becomes large due to a signal delay time of the Hall sensor in addition to a reference offset angle of the Hall sensor that indicates how much the Hall sensor deviates from a reference position of the motor.

Equation 1, shown below, is used to analyze a relationship between $V_d$ and $V_q$ by using a trigonometric function relationship formula and adding a value, which is obtained by multiplying a reference offset angle and a time delay of the Hall sensor by an angular velocity, to an offset angle at a speed point 1 (angular velocity $\omega_1$) in the inertia braking section in which the zero current control is performed. Equation 2 likewise is derived at a speed point 2 (angular velocity $\omega_2$). The time derived from the reference offset angle and the signal delay of the Hall sensor is obtained based on Equations 1 and 2. The control for compensating for both the reference offset angle of the Hall sensor and the signal delay of the Hall sensor may be performed by using the time.

In the first step S10, the offset angle may be calculated based on the following Equations 1 and 2. The method of calculating the reference offset angle of the position of the motor and the signal delay element of the Hall sensor performs the zero current control when the inertia braking section occurs during the operation of the motor and may be performed by being transformed to a d-q conversion Voltage equation using the following Equation 1 for convenience of calculation.

$$V_{dsyn} = R_s \times I_{dsyn} + L_d \times \frac{dIdsyn}{dt} - L_q \times \omega_e \times I_{qsyn}$$

$$V_{dsyn} = R_s \times I_{qsyn} + L_q \times \frac{dIqsyn}{dt} - L_q \times \omega_e \times I_{qsyn} + V_{emf}$$

$$V_{emf} = \lambda \times \omega_e.$$

[Equation 1]

($V_{dsyn}$: d-axis output voltage, $V_{qsyn}$: q-axis output voltage, $R_s$: phase resistance, $I_{dsyn}$: d-axis current measured value, $I_{qsyn}$: q-axis current measured value, $L_d$: d-axis inductance value, $L_q$: q-axis inductance value, $\omega_e$: electric angular velocity, $V_{emf}$: back electromotive force voltage, λ: back electromotive force constant)

$$\theta = \tan^{-1}\frac{V_d}{V_q}$$

[Equation 2]

The first step (S10) may calculate the offset angle θ by using $$\theta = \tan^{-1}\frac{V_d}{V_q}$$

($V_d$: d-axis voltage, $V_q$: q-axis voltage). The q-axis voltage may be a back electromotive voltage when the zero current control is performed. A value of 0 may be applied to the d-axis voltage when there is neither an offset angle nor a delay time.

Regarding the offset angle, the reference offset angle error and the delay signal of the Hall sensor may be expressed as a function of speed, as shown in the following Equation 3.

$$\theta = \theta_{offset} + \omega_0 t_0$$

[Equation 3]

($\omega_0$: angular velocity (rad/s), $t_0$: delay time of Hall sensor signal)

The second step S30 calculates the reference offset angle $\theta_{offset}$ of the Hall sensor and the delay time t by using an angular velocity ω at any two points in the inertia braking section by using the equation for calculating the offset angle θ. The reference is made to the following Equation 4.

$$\theta_{offset} + \omega_1 t_0 = \tan^{-1}\frac{V_{d1}}{V_{q1}}$$

$$\theta_{offset} + \omega_2 t_0 = \tan^{-1}\frac{V_{d2}}{V_{q2}}$$

[Equation 4]

The second step S30 may calculate the reference offset angle $\theta_{offset}$ and the delay time t (S305) by applying the equation $\theta = \theta_{offset} + \omega_0 t_0$ ($\omega_0$: angular velocity (rad/s), $t_0$: delay time of Hall sensor) and inputting any angular velocities $\omega_1$ and $\omega_2$ and $\theta_1$ and $\theta_2$ in the inertia braking section (S301 and S303).

The second step S30 may acquire an average of values obtained by calculating the $V_{d1}$ and $V_{q1}$ values from ±a rpm of $\omega_1$ in order to improve measured value accuracy of $V_{d1}$ and $V_{q1}$, and may acquire an average of values obtained by calculating the $V_{d2}$ and $V_{q2}$ values from ±a rpm of $\omega_2$ in order to improve measured value accuracy of $V_{d2}$ and $V_{q2}$ (S301).

When a solution is obtained by using Equation 4, it is possible to obtain the reference offset angle $\theta_{offset}$ and the delay time $t_0$. Thereafter, $V_d$ value is measured in the inertia braking section by the zero current control, such that it is possible to perform the correction again when the value exceeds the reference value (in consideration of a measurement error and a sampling error) close to 0.

The third step S50 calculates a corrected q-axis voltage and a corrected d-axis voltage through the zero current control corrected by the reference offset angle $\theta_{offset}$ and the delay time t. The third step s50 compares the corrected q-axis voltage and the corrected d-axis voltage with a reference error. When the corrected q-axis voltage and the corrected d-axis voltage exceed the range of the reference error, it is possible to correct the signal delay of the Hall sensor by repeating the first to third steps S10, S30 and S50.

When the method of correcting a signal delay of a Hall sensor for an air compressor motor according to an embodiment of the present disclosure is applied, there may be an improved effect when a signal measurement delay of the Hall sensor is 18 μs in the case of a fuel cell vehicle, a position measurement error of 11° occurs during a maximum speed operation, the signal measurement delay of the Hall sensor is increased by 4 μs, a maximum speed is increased by 2.5 times, and a position error is increased by 3 times in comparison with a linear model following control (LMFC) vehicle manufactured in the related art.

While the present disclosure has been described in detail above with reference to the representative embodiment, those of ordinary skill in the art to which the present disclosure pertains will understand that the embodiment may be variously modified without departing from the scope of the present disclosure. Accordingly, the scope of the present disclosure should not be limited to the described embodiments but should be defined not only by the appended claims but also by all changes or modified forms induced from an equivalent concept to the claims.

What is claimed is:

1. A method of correcting a signal delay of a Hall sensor for an air compressor motor which controls a speed error of torque oscillation when the air compressor motor for a fuel cell vehicle rotates at a high speed, the method comprising:
a first step of calculating an offset angle θ from a voltage equation, to which a q-axis voltage and a d-axis voltage are applied, by performing zero current control when an inertia braking section occurs during an operation of the motor;
a second step of calculating a reference offset angle $\theta_{offset}$ of the Hall sensor and a delay time t by using an angular velocity to at any two points in the inertia braking section by using the equation for calculating the offset angle θ; and
a third step of calculating a corrected q-axis voltage and a corrected d-axis voltage through the zero current control corrected by the reference offset angle $\theta_{offset}$ and the delay time t and comparing the corrected q-axis voltage and the corrected d-axis voltage with a reference error,
wherein when the corrected q-axis voltage and the corrected d-axis voltage exceed a range of the reference error, the first to third steps are repeated to correct the signal delay of the Hall sensor.

2. The method of claim 1, wherein the first step calculates the offset angle θ by using $$\theta = \tan^{-1} \frac{V_d}{V_q}$$

($V_d$: d-axis voltage, $V_q$: q-axis voltage).

3. The method of claim 1, wherein in the first step, the q-axis voltage is a back electromotive voltage when the zero current control is performed, and 0 is applied to the d-axis voltage when there is neither an offset angle nor a delay time.

4. The method of claim 1, wherein the second step calculates the reference offset angle $\theta_{offset}$ and the delay time t by applying an equation $\theta = \theta_{offset} + \omega_0 t_0$ ($\omega_0$: angular velocity (rad/s), $t_0$: delay time of Hall sensor) and inputting any angular velocities $\omega_1$ and $\omega_2$ and $\theta_1$ and $\theta_2$ in the inertia braking section.

* * * * *

UNITED STATES PATENT AND TRADEMARK OFFICE
CERTIFICATE OF CORRECTION

PATENT NO. : 10,903,768 B2
APPLICATION NO. : 16/593394
DATED : January 26, 2021
INVENTOR(S) : Sung-Do Kim et al.

Page 1 of 1

It is certified that error appears in the above-identified patent and that said Letters Patent is hereby corrected as shown below:

In the Specification

Column 4, Line 14:

$$V_{qsyn} = R_s \times I_{qsyn} + L_q \times \frac{dI_{qsyn}}{dt} - L_q \times \omega_e \times I_{qsyn} + V_{emf}$$

Should be replaced with:

$$V_{qsyn} = R_s \times I_{qsyn} + L_q \times \frac{dI_{qsyn}}{dt} + L_q \times \omega_e \times I_{qsyn} + V_{emf}$$

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*